United States Patent [19]

Henze et al.

[11] Patent Number: 5,703,199
[45] Date of Patent: Dec. 30, 1997

[54] PROCESS FOR THE PREPARATION OF NITROGEN-CONTAINING POLYMERS

[75] Inventors: Andree Henze, Hofheim, Germany; Gordon Calundann, North Plainfield, N.J.

[73] Assignee: Hoechst Aktiengesellschaft, Frankfurt, Germany

[21] Appl. No.: 539,481

[22] Filed: Oct. 5, 1995

[30] Foreign Application Priority Data

Oct. 7, 1994 [DE] Germany .................. P 44 35 873.3

[51] Int. Cl.[6] ............................................. C08G 69/36
[52] U.S. Cl. ............... 528/329.1; 528/310; 528/315; 528/330; 528/331; 528/184; 528/268; 524/606; 524/607; 524/612
[58] Field of Search .................................. 528/310, 315, 528/288, 292, 329.1, 330, 331, 184, 268; 524/606, 607, 612

[56] References Cited

U.S. PATENT DOCUMENTS

| 3,174,974 | 3/1965  | Siegrist et al. |         |
|-----------|---------|-----------------|---------|
| 3,784,517 | 1/1974  | Hedberg et al.  |         |
| 3,925,295 | 12/1975 | Osborn et al.   |         |
| 4,102,846 | 7/1978  | Bentley et al.  |         |
| 4,247,443 | 1/1981  | Sasaki et al.   | 524/341 |
| 4,758,651 | 7/1988  | Sikkema         |         |
| 5,177,258 | 1/1993  | Becker et al.   |         |
| 5,196,505 | 3/1993  | Poll et al.     |         |

FOREIGN PATENT DOCUMENTS

| 0 275 163 | 7/1988 | European Pat. Off. |
| 0 275 164 | 7/1988 | European Pat. Off. |
| 0275163   | 7/1988 | European Pat. Off. |
| 0 306 165 | 3/1989 | European Pat. Off. |
| 0306165   | 3/1989 | European Pat. Off. |

*Primary Examiner*—James J. Seidleck
*Assistant Examiner*—Duc Truong
*Attorney, Agent, or Firm*—Curtis, Morris & Safford, P.C.

[57] ABSTRACT

To prepare nitrogen-containing aromatic polymers, for example polyamides, polyimides and polybenzimidazoles, polyvalent aromatic carboxylic acids and aromatic diamines and/or aminocarboxylic acids or reactive derivatives thereof are reacted in a high-boiling inert solvent with the addition of a heat-stable dispersing auxiliary, and volatile by-products formed in this reaction are distilled off. When the reaction has ended, the batch is cooled and the polymer formed is filtered off.

7 Claims, No Drawings

PROCESS FOR THE PREPARATION OF NITROGEN-CONTAINING POLYMERS

The present invention relates to a process for the preparation of aromatic polyamides, polyamide-imides, polyimides and polybenzimidazoles in nonaqueous dispersions.

The excellent properties of aromatic polyamides, polyimides and polyamide-imides and of polybenzimidazoles have been known for a relatively long time. Their outstanding heat stability and their good mechanical properties are to be singled out in particular.

The processes known for aliphatic polyamides cannot be transferred without reservation to aromatic polyamides, because the reactivity of aromatic diamines is lower than that of aliphatic diamines. Direct condensation of aromatic diamines with aromatic dicarboxylic acids is possible only with the use of catalysts (DE 39 42 941). Disadvantages here are traces of catalysts in the polycondensate (dialkylaminopyridines and/or phosphonic acids) and the sensitivity of aromatic diamines to oxidation at higher temperatures.

Aromatic polyamides can be prepared by polycondensation of activated aromatic diamines, preferably acetylated diamines, with aromatic dicarboxylic acids in the melt at 220° C.–360° C. (U.S. Pat. No. 4,758,651). The use of activated derivatives of aromatic dicarboxylic acids, preferably the phenyl esters, is also possible. However, a condition of the processes described is that the polyamides formed have a sufficiently low melt viscosity at the reaction temperature. Since most aromatic polyamides have a very high melt viscosity or are highly crystalline under polycondensation conditions, these processes cannot be applied to all aromatic polyamides and the molecular masses which can be achieved are limited.

Several processes exist for the preparation of aromatic polyimides. Polyamidocarboxylic acids are formed by reaction of tetracarboxylic acid anhydrides and diamines in a dipolar aprotic solvent at 0° C. to 150° C. and are then converted into the polyimide by imidation. The water is split off either in solution using dehydrating agents or in bulk by heating.

The poor space-time yield and the cumbersome isolation of the polymers are disadvantages here. Polyimides which have a sufficiently low melt viscosity at the reaction temperature (just below the thermal decomposition limit) can also be obtained from aromatic diamines and tetracarboxylic acid anhydrides in a direct melt reaction at 150° C.–380° C. Polymers having very high melt viscosities cannot be prepared by this process. Polybenzimidazoles are in general prepared by reaction of aromatic dicarboxylic acids or phenyl esters thereof with aromatic tetraamines. In general, a melt condensation of the monomers is carried out until the melt solidifies, and this solid is then cooled and powdered and subjected to a solid phase condensation in a second step at temperatures up to 400° C. (U.S. Pat. No. 3,174,974). The two-stage procedure for the synthesis is a disadvantage here. A reaction procedure as a precipitation condensation in high-boiling solvents, such as diphenyl sulfone, is also described (U.S. Pat. No. 3,784,517). Here, however, the polymer content in the solvent is limited by the solubility of the monomers in the high-boiling solvent. In order to bypass these disadvantages, attempts have already been made to carry out the polycondensations in non-aqueous dispersions. DE-OS 2707491 describes a process for the preparation of stable dispersions of polymer particles, in which monomeric starting substances are reacted in the presence of a solid modifying agent, for example finely divided titanium dioxide, and in the presence of a stabilizer, for example a block copolymer having a content of 12-hydroxy-stearic acid, in a high-boiling hydrocarbon. The preparation of polyurethanes, polyamides, polyesters and polyester-amides is described. Purely aromatic polyamides are not mentioned.

According to EP 306165, dispersions of high molecular weight polyamides in a hydrocarbon are prepared by polycondensation of nylon salts in the presence of a hypophosphite catalyst. The nylon salts are prepared by reaction of aliphatic, alicyclic or aromatic dicarboxylic acids with aliphatic, alicyclic or aromatic diamines. Neither the nylon salt employed nor the polyamide produced should melt under the reaction conditions. Dispersing auxiliaries are therefore also added.

According to JP 01129024 A2, crystals of relatively low molecular weight polyphenylene-terephthalamide are prepared by polycondensation of p-phenylenediamine with diphenyl dithioterephthalate in high-boiling hydrocarbons. No dispersing auxiliaries are added.

Finally, EP 0275164 describes the preparation of completely aromatic polyesters which are liquid-crystalline substances in the melt, by polycondensation of acetylated diols or hydroxycarboxylic acids or mixtures thereof with dicarboxylic acids, the starting substances being dispersed in a high-boiling oil.

The process of dispersion polycondensation at high temperatures in an inert medium in which both the polymer and the monomers are insoluble is thus known in principle. However, the variant with dispersing auxiliaries has not yet been extended to nitrogen-containing polymers.

The object was therefore to prepare nitrogen-containing polymers, in particular polyamides and polyimides, which are derived from aromatic polyvalent diamines and aromatic polycarboxylic acids and have a particularly high molecular weight and/or a very narrow molecular weight distribution.

A process has now been found for the preparation of nitrogen-containing polymers in which polybasic carboxylic acids and polyvalent diamines and/or aminocarboxylic acids or reactive derivatives thereof are reacted in a high-boiling inert solvent with the addition of a heat-stable dispersing auxiliary, volatile by-products formed in this reaction are distilled off and, when the reaction has ended, the batch is cooled and the polymer formed is filtered off. The process comprises employing aromatic starting substances. Catalysts are not required.

The process according to the invention is particularly suitable for the preparation of polymers which have a glass transition temperature of at least 200° C. and/or of which the crystalline melting point is so high that it exceeds the reaction temperature.

The process according to the invention is particularly suitable for the preparation of aromatic polyamides. In this process, an aromatic dicarboxylic acid or an aromatic dicarboxylic acid ester, for example a phenyl ester or thiophenyl ester, is reacted with an aromatic diamine or an N-acyl derivative thereof, in particular the acetyl derivative, if appropriate with the addition of aromatic aminocarboxylic acids, and the polyamide formed is isolated. To prepare aromatic polyamides, the dicarboxylic acids terephthalic acid, isophthalic acid, the diphenylether-dicarboxylic acids, biphenyldicarboxylic acids or 1,4- or 2,6-naphthalenedicarboxylic acids are preferably employed. Aromatic aminocarboxylic acids, such as aminophenoxybenzoic acid or the aminobenzoic acids, can be added to the batch or else reacted in the absence of dicarboxylic acids and diamines.

Aromatic diamines which are employed are, in particular, those of the following structure:

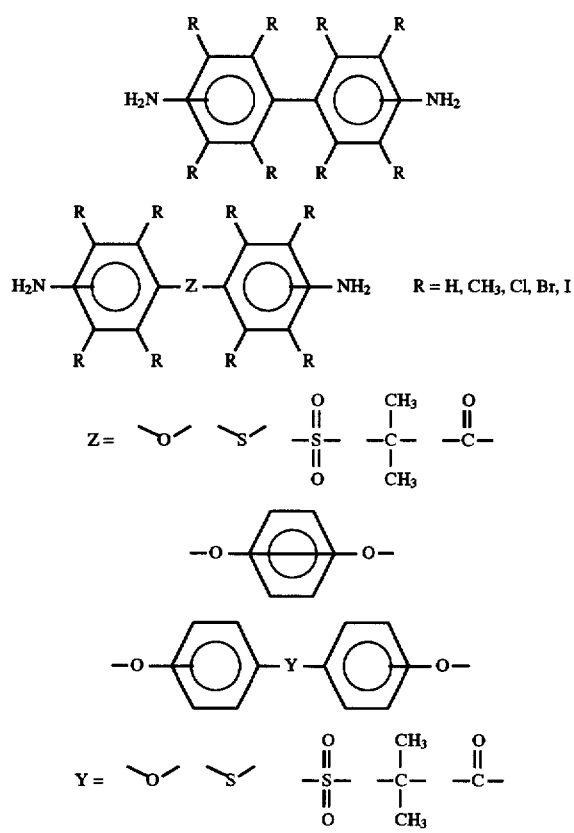

R = H, CH₃, Cl, Br, I and p-, m- and o-phenylenediamine.

The process according to the invention is also suitable for the preparation of aromatic polyimides. In this process, an aromatic tetracarboxylic acid or the anhydride thereof is reacted with an aromatic diamine or an N-acyl derivative thereof and the polyimide formed is filtered off from the reaction batch. Pyromellitic anhydride or tetracarboxylic acid anhydride of the following structure, for example, are employed.

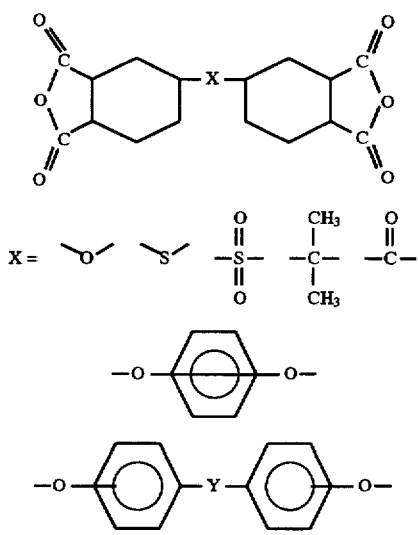

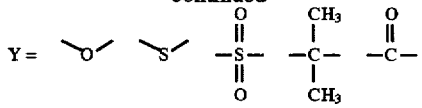

The free tetracarboxylic acids or mixtures of these compounds can also be used. The reaction temperature is initially 150°–300° C. and, toward the end of the reaction, 230°–340° C.

The process according to the invention can also be used for the preparation of polybenzimidazoles. In this process, an aromatic dicarboxylic acid or the phenyl ester thereof is reacted with an aromatic tetraamine and the polybenzimidazole formed is isolated by filtration. The reaction temperature is initially 180°–300° C., and toward the end of the reaction 370° C. The tetraamines have the following structure:

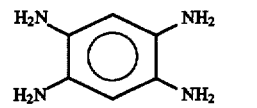

or

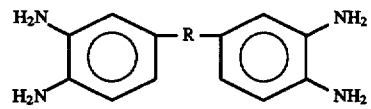

In these formulae, R is a divalent radical, for example a single bond or

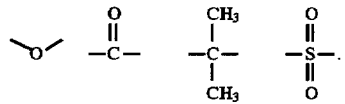

Typical dicarboxylic acids are isophthalic acid, terephthalic acid, 1,4-naphthalenedicarboxylic acid, 1,6-naphthalenedicarboxylic acid and 4,4'-dicarboxybiphenyl, or phenyl esters thereof. If the free dicarboxylic acids are employed, 0.5–2% by weight of catalysts, such as triphenylphosphine, dichlorophenylphosphine, chlorodiphenylphosphine, triphenyl phosphite or other catalysts of the phosphine or phosphite type, are used.

Finally, the process according to the invention is suitable for the preparation of aromatic polyamideimides. For this, an aromatic tricarboxylic acid anhydride (for example trimellitic anhydride) is reacted with an aromatic diamine or an acyl derivative thereof and, finally, the polymer formed is filtered off. The formation of the polyamide acid is carried out at 150°–300° C. and the formation of the polyamide-imide is carried out at 230°–340° C.

The monomers mentioned can be employed individually or as a mixture, under the condition that the equivalence of the functional groups is preserved. However, it is also possible to add up to 10 mol % (based on the amounts of acids or of diamines) of a monofunctional substance to the batch, i.e. to deviate from the equivalence of the functional groups, for the purpose of limiting the molecular mass.

High-boiling inert solvents which are employed are, in particular, high-boiling hydrocarbon mixtures. However, any other inert reaction medium which has a sufficiently high boiling point, does not dissolve the polymer synthesized and does not undergo side reactions with the monomer or the polymer can also be used. Those solvents which form an azeotrope with the low molecular weight by-product formed in the polycondensation and thereby remove this very effectively from the reaction system by distillation are particularly preferred.

Examples of such inert solvents are:
a) hydrogenated terphenyls, tradename ®"Santotherm", (Monsanto)
b) triaryldimethanes under the tradename ®"Marlotherm" (Hüls AG)
c) any high-boiling hydrocarbon mixture, for example "Terminol E" (Shell AG)
d) mixtures of oligomeric fluorine compounds, for example ®"Hostinert" from Hoechst AG,
and mixtures of these solvents with one another.

The dispersing auxiliaries added should prevent aggregates of the monomer particles and of the polymer particles greater than 100 μm from forming in the entire temperature range of the reaction. In general, 1–50% by weight (based on the dispersing medium) of dispersing auxiliaries will be added to the batch in order to achieve stable dispersions. Amounts of 1–10% by weight, and in particular 2–4% by weight, are preferred. The dispersing auxiliaries should have no functional groups which react with the monomers and thereby impair the polycondensation. A shift in the equivalence of the functional groups owing to the dispersing auxiliary, which would lead to depression of the maximum degree of polycondensation which can be achieved, is particularly undesirable. The dispersing auxiliaries must of course be sufficiently stable to heat under the polycondensation conditions, since degradation products could lead to a deterioration in the properties of the polycondensates and the stabilizing action on the dispersion is reduced.

The stabilizing action of the dispersing auxiliaries can be based on the fact that—depending on their structure —the viscosity of the inert solvent is increased in the region of the polycondensation reaction (example: ®Bentone 38 from Rheox Inc.). The stabilizing action can also be based on the fact that the dispersing auxiliaries have an amphiphilic character, i.e. some functional groups of the dispersing auxiliary have a high affinity for inert (usually nonpolar) solvents, and other functional groups in turn have a high affinity for the polycondensate. This leads to a concentration of the dispersing auxiliaries at the boundary between the polycondensate and inert solvent. Examples of such substances are block copolymers and polymers, in particular of polar and non-polar monomers, for example the copolymers obtainable under the tradename ®"Surlyn" from DuPont. However, this group also includes low molecular weight amphiphilic compounds, such as, for example, surfactants. For example, pyrrolidones with long-chain N-alkyl groups, for example with $C_6$–$C_{26}$-alkyl groups, in particular with $C_9$–$C_{22}$-alkyl groups, on the one hand have a high affinity for the nonpolar inert solvent and a high affinity for the monomer or polymer. The stabilizing action of the dispersing auxiliaries can furthermore be based on the fact that they modify the surface tension of the dispersed particles of monomer and polymer. The use of hydrophobically treated clay minerals, such as Bentone 38, for the preparation of aliphatic polyamides and liquid crystal aromatic polyesters is known from EP 0 275 163.

It is also possible to employ several dispersing auxiliaries at the same time, of which one component, for example, stabilizes the dispersion of the monomers and the other component has a stabilizing action on the polymer dispersion.

The process according to the invention overcomes the abovementioned problems of the high viscosity during melt processes or the crystallinity of the polymers at the polycondensation temperature, which have limited the effectiveness of melt polycondensation or polycondensation in the past. The reason for the very advantageous progress of the process according to the invention is probably the high specific surface area of the dispersed polymer particles and the effective removal of by-products of the polycondensation by distillation, in particular with the formation of an azeotrope of these by-products with the inert solvent. Surprisingly, it is irrelevant for the process whether the polycondensate is highly crystalline, partly crystalline or amorphous. Furthermore, it is surprising that products of high molecular weight are obtained by the process according to the invention, although the aromatic chain members allow only a relatively low chain mobility.

The invention is illustrated in more detail by the following examples.

EXAMPLE 1

(amorphous polyamide)

71.84 g (=0.175 mol) of 2,2-bis(4-(4-aminophenoxy)phenyl)propane (=BAB) are placed under a nitrogen atmosphere in a 2 l three-necked flask with a nitrogen inlet, stirrer, internal thermometer and dropping funnel by evacuation and repressurizing with nitrogen several times. The contents of the flask are melted and are acetylated at about 140° C. by dropwise addition of 0.35 mol (34.2 ml) of acetic anhydride. A distillation bridge is attached and the acetic acid formed is then distilled off. The flask now contains a total of 86.55 g of the acetylated compound.

23.25 g of terephthalic acid (0.14 mol) and 5.815 g (0.035 mol) of isophthalic acid are added (total amount of monomers =115.6 g). During the distillation, 400 g of Santotherm are mixed with 18.6 g of ®Bentone 38 (4%, based on the total amount of Santotherm) using a disperser. After 10 minutes, 6.15 g (5.16 ml) of propylenecarbonate (33%, based on the Bentone 38) are added in order to improve the shearing action on the Bentone 38 and to increase the viscosity of the Santotherm/Bentone 38 mixture.

This mixture is slowly added to the hot monomers which have a temperature of 230° C. The mixer is flushed with 66 g of Santotherm and these are likewise added to the reaction batch. The temperature is increased to finally 280° C. while stirring as intensively as possible. The total reaction time is 8 hours. When the condensation has ended, the mixture is cooled, while stirring (at least until consolidation of the dispersed particles has occurred), and the reaction batch is filtered, washed with toluene (in the mixer) and dried.

94 g of a pale beige powder having a Standinger index (intrinsic viscosity) of 0.7 dl/g (in NMP at 25° C.) and a glass transition temperature of 220° C. are obtained. The average particle size is 50 μm.

EXAMPLE 2

(partly crystalline aramid)

143.7 g (=0.35 mol) BAB and 5.33 g (0.039 mol) of p-aminobenzoic acid are placed under a nitrogen atmosphere in a 1 l three-necked flask with a nitrogen inlet, stirrer, internal thermometer and dropping funnel by evacuation and repressurizing with nitrogen several times. The contents of the flask are melted and are acetylated at about 140° C. by dropwise addition of 0.74 mol (70 ml) of acetic anhydride. A distillation bridge is attached and the acetic acid formed is then distilled off. The flask now contains a total of 180.1 g of the acetylated compounds. 58.15 g (0.35 mol) of terephthalic acid are added (total amount of monomers =238.25 g). During the distillation, 400 g of of Santotherm are mixed with 14.3 g of Bentone 38 (3%, based on the total amount of Santotherm) with a disperser. After 10 minutes, 4.71 g (4 ml) of propylene carbonate (33%, based on the Bentone 38) are added. This mixture is slowly added to the hot acetylated compounds, which have a temperature of 230° C. The mixter is flushed with 76.5 g of Santotherm and these are likewise added to the reaction batch. The temperature is increased to finally 280° C., while stirring as intensively as possible. During this operation, further acetic acid distills off. When the condensation has ended, the mixture is cooled, while stirring (at least until consolidation of the dispersed particles has occurred), and the reaction batch is filtered, washed with toluene (in the mixer) and dried.

205 g of a pale beige powder having an intrinsic viscosity of 0.6 dl/g are obtained. The glass transition point of the polymer is 215° C. and the crystalline melting point is 328° C.

EXAMPLE 3

(polyamide-imide)

143.7 g (=0.35 mol) BAB are placed under a nitrogen atmosphere in a 2 l three-necked flask with a nitrogen inlet, stirrer, internal thermometer and dropping funnel by evacuation and repressurizing with nitrogen several times. The contents of the flask are melted and are acetylated at about 140° C. by dropwise addition of 0.725 -mol (68.4 ml) of acetic anhydride.

A distillation bridge is attached and the acetic acid formed is then distilled off. The flask now contains a total of 173.1 g of the acetylated compounds.

During the distillation, 850 g of Santotherm are mixed with 2.29 g of Surlyn 601 and 6.875 g of ®Aerosil R 972 (Degussa AG) in a mixer. This mixture is slowly added to the hot acetylated compound which has a temperature of 210° C. The mixer is rinsed with 66 g of Santotherm and these are likewise added to the reaction batch. 0.336 mol (96% of the molar amount) or 64.55 g of trimellitic anhydride are now slowly added in 3 portions to the emulsion formed.

The temperature is increased to finally 300° C., while stirring as intensively as possible. During this operation, further acetic acid distills off. Towards the end of the reaction, condensation is carried out at 300° C. for 1 hour. When the condensation has ended, the mixture is cooled, while stirring (at least until consolidation of the dispersed particles has occurred), and the reaction batch is filtered, washed with toluene (in the mixer) and dried.

198.3 of a yellow polyamide-imide powder having an intrinsic viscosity of 0.5 dl/g are obtained. The average particle size is 35 μm. The glass transition point of the polymer is 256° C.

EXAMPLE 4

(crystalline aromatic polyamide)

34.95 g of p-aminobenzoic acid (0.255 mol) are placed under a nitrogen atmosphere in a 1 l three-necked flask with a nitrogen inlet, stirrer, internal thermometer and dropping funnel by evacuation and depressurizing with nitrogen several times. The contents of the flask are melted and are acetylated at about 140° C. by dropwise addition of 0.255 mol (25 ml) of acetic anhydride. The flask now contains a total of 45.66 g of the acetyl compound.

During the distillation, 400 g of Santotherm are mixed with 4.66 g of Bentone 38 (1%, based on the oil) with a disperser. After 10 minutes, 1.54 g (1.3 ml) of propylene carbonate (33%, based on the Bentone 38) are added.

This mixture is slowly added to the hot melt of N-acetyl-p-aminobenzoic acid, which has a temperature of 200° C. The mixer is rinsed with 66 g of Santotherm and these are likewise added to the reaction batch. The temperature is increased to finally 340° C., while stirring as intensively as possible. Condensation is carried out at this temperature for 4 hours. During this operation, further acetic acid distills off. When the condensation has ended, the mixture is cooled, while stirring, and the reaction batch is filtered, washed with toluene (in the mixer) and dried.

30.1 g of a fine-grained yellow powder of poly-1,4-benzamide having an intrinsic viscosity of 0.8 dl/g are obtained. The average particle size is 60 μm.

EXAMPLE 5

(polybenzimidazole)

65.2 g of 3,3',4,4'-tetraaminobiphenyl (0.304 mol) and 50.56 g of isophthalic acid (0.304 mol) are weighed into the reactor and the reactor is placed under a nitrogen atmosphere by evacuation and repressurizing with nitrogen several times. 400 g of ®Santotherm, 12 g of ®Bentone 38 and 3.33 ml of propylenecarbonate are mixed separately and the mixture is introduced into the reactor. 3.77 g of triphenyl phosphite are added as catalyst. The reactor is evacuated again and placed under a nitrogen atmosphere. The temperature is increased to 240° C. and condensation is carried out at this temperature for one hour (elimination of water). The temperature is then increased to 365° C. and condensation is carried out at this temperature for a further 4 hours.

The polybenzimidazole which has been isolated by filtration, after cooling, and washed twice with toluene is in the form of a fine yellow powder having an average particle size of 10 μm, and has an intrinsic viscosity (30° C., 0.5 g/100 ml of concentrated sulphuric acid) of 0.65 dl/g.

We claim:

1. A process for the preparation of a nitrogen-containing polymer in which a polyvalent carboxylic acid and diamine and/or aminocarboxylic acid or a reactive derivative thereof are reacted in a high-boiling inert solvent with the addition of a heat-stable dispersing auxiliary, the volatile by-products formed in this reaction are distilled off and, when the reaction has ended, the batch is cooled and the polymer formed is filtered off, which comprises employing aromatic starting substances.

2. The process as claimed in claim 1, wherein an aromatic dicarboxylic acid or a reactive derivative thereof is reacted with an aromatic diamine or the N-acetyl derivative thereof, optionally with the addition of an aromatic aminocarboxylic acid, and the polyamide formed is isolated.

3. The process as claimed in claim 1, wherein an aromatic aminocarboxylic acid or a derivative thereof is reacted and the polyamide formed is isolated.

4. The process as claimed in claim 1, wherein an aromatic tetracarboxylic acid or the anhydride thereof is reacted with an aromatic diamine or the N-acetyl derivative thereof and the polyimide formed is isolated.

5. The process as claimed in claim 1, wherein an aromatic tricarboxylic acid anhydride is reacted with an aromatic diamine or the acetyl derivative thereof and the polyamide-imide formed is isolated.

6. The process as claimed in claim 1, where an aromatic dicarboxylic acid or the phenyl ester thereof is reacted with an aromatic tetramine, optionally with the addition of a catalyst, and the polybenzimidazole formed is isolated.

7. The process as claimed in claim 1, wherein an N-alkylpyrrolidone is added as a dispersing auxiliary.

\* \* \* \* \*